Figure 3:
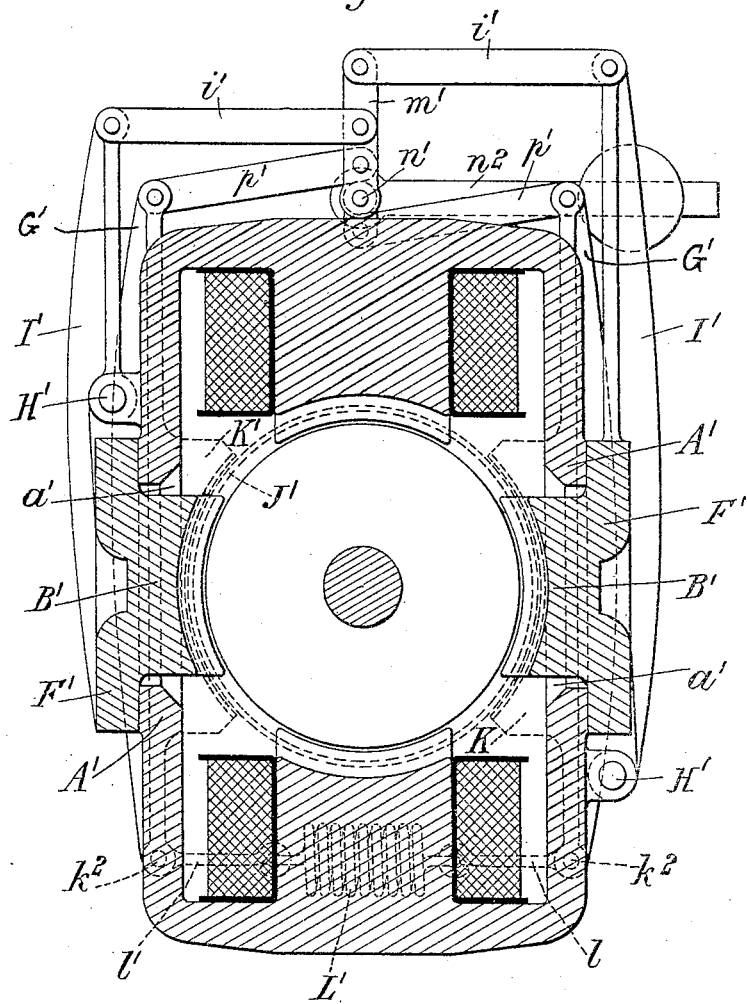

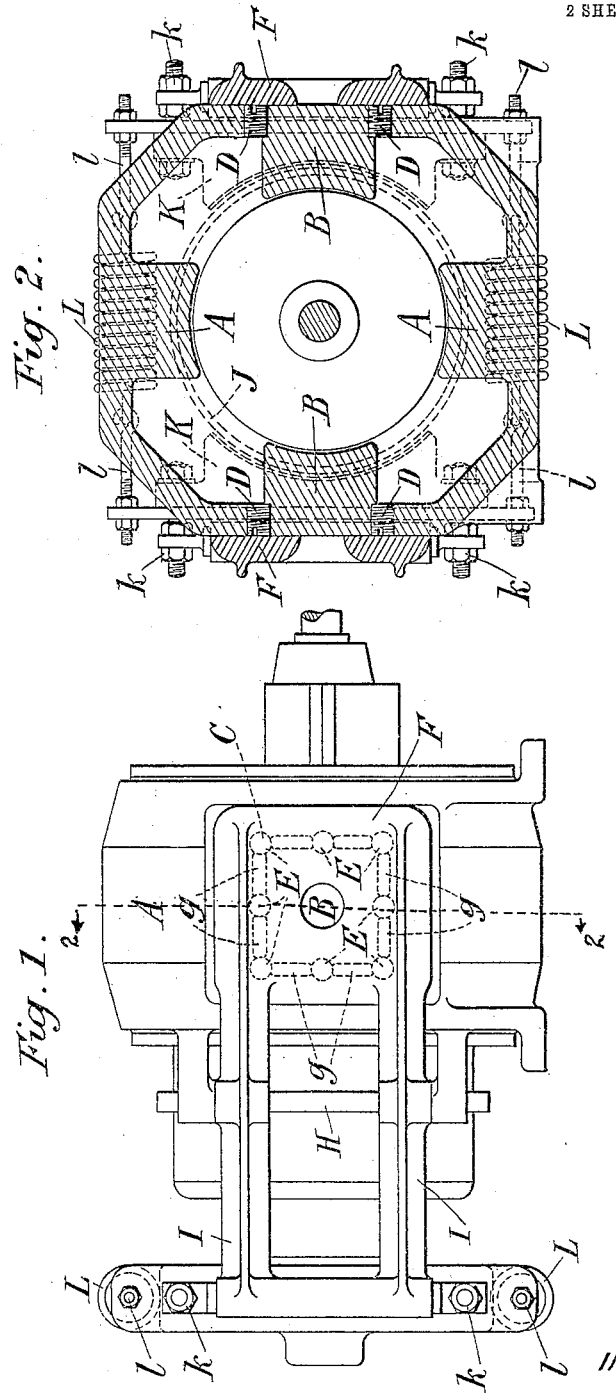

UNITED STATES PATENT OFFICE.

WILLIAM HARDING SCOTT, OF NORWICH, ENGLAND.

BRAKING MECHANISM FOR ELECTRIC MOTORS.

No. 815,750.  Specification of Letters Patent.  Patented March 20, 1906.

Application filed March 27, 1905. Serial No. 252,414.

*To all whom it may concern:*

Be it known that I, WILLIAM HARDING SCOTT, electrical engineer, a subject of the King of Great Britain and Ireland, residing at Gothic Works, Norwich, in the county of Norfolk, England, have invented certain new and useful Improvements in Connection with the Braking Mechanism for Electric Motors, of which the following is a specification.

My invention relates to electric motors in which the lines of force in the magnetic circuit of the motor are utilized for giving the force necessary for holding off the brake of the motor when the current is on the motor. Formerly portions of the magnetic metal between the yoke or magnetic frame of the motor and the pole-pieces utilized to hold off the brake were removed, so as to utilize the lines of force that tend to jump the gaps thus formed, for better attracting magnetic metal connected with the brake-operating mechanism, so that when the said magnetic metal is attracted the brakes are held off. In this arrangement a considerable amount of magnetic metal had to be left to form a sufficiently strong connection between the said pole-pieces and the yoke or magnetic frame, and therefore the full benefit of the jumping of the lines of force was not obtained.

It is the object of my present invention to obtain this full benefit, which I do by removing all or practically all of the magnetic metal between the said pole-pieces and the yoke or magnetic frame and either carrying the said pole-pieces from the yoke or magnetic frame by non-magnetic material or by carrying the said pole-pieces on the magnetic metal which is attracted, as aforesaid, to hold off the brake.

I will describe, with reference to the accompanying drawings, ways in which my present invention can be practically carried into effect.

Figure 1 is a side elevation of sufficient of an electric motor to show the application thereto of an arrangement, according to my invention, in which the pole-pieces which are employed for holding off the brake are connected with the yoke or magnetic frame of the motor. Fig. 2 is a section taken on the line 2 2, Fig. 1; and Fig. 3 is a longitudinal section of a motor, showing an arrangement, according to my invention, wherein the said pole-pieces are connected to the magnetic metal which is attracted to hold off the brakes.

Referring first to Figs. 1 and 2, the yoke or magnetic frame A and pole-pieces B are cast together, with openings $g$ analogous to those formed as aforesaid, or the said openings may be formed in any other convenient way so as to leave, as in the aforesaid, sufficient magnetic metal to hold the said pole-pieces and yoke or magnetic frame together. According to my present invention I remove all or practically all remaining metal and substitute for it non-magnetic material—such, for example, as brass—so as to give a good mechanical connection, and this I preferably do as follows: I drill a hole, as shown at C, through the metal that is left between two adjacent of the aforesaid openings $g$, the said hole C being of such a size that in making it all or practically all of the said metal is removed, only such metal being left as may be necessary for properly performing the operations of drilling and tapping, and some or all of the magnetic metal so left may be cut away afterward. The said hole is "tapped," (screw-threaded,) and into it is tightly screwed a connector or plug of brass or other suitable non-magnetic material, as shown at D. I then proceed in the same way with the magnetic metal between another two adjacent openings $g$, removing the said metal and inserting a connector or plug of non-magnetic material in its place, as before, and so on till I have substituted non-magnetic material for all or practically all of the said magnetic metal between the several openings $g$, and there is a continuous or practically continuous absence of magnetic metal between the magnetic metal of the yoke or magnetic frame A and the magnetic metal of the pole-pieces B. The dotted circles at E in Fig. 1 indicate where the magnetic metal is removed and non-magnetic material inserted by the aforesaid successive operations, which are carried out in such order that the pole-pieces are not disturbed, but remain in the position they originally occupied. The boring of the pole-pieces to suit the armature of the motor may be effected either before or after the substitution of non-magnetic material for magnetic metal has been effected, as aforesaid.

The brake mechanism may be of any convenient construction. It is shown as consisting of levers I, centered at H, one end of each lever carrying the magnetic metal F and the other end being connected by screws and nuts $k$ to the part carrying the brake-blocks K for bearing on the brake-wheel J under the action of the springs L, connected by hooks $l$ to the parts carrying the brake-blocks, as shown.

Referring now to Fig. 3, I cast or form in the yoke or magnetic frame A' of the motor a large opening $a'$ at the places where the pole-pieces B' are situated, the said openings $a'$ being of such size that they each leave the required gap free of magnetic metal between the yoke or magnetic frame A' and the pole-piece B'. The pole-pieces B' are fixed to the magnetic plates F', (or the equivalents,) connected with the brake-operating arrangements, or the pole-pieces may each be cast with its respective plate F' or the equivalent. After machining the plates F' or the equivalents and the parts of the yoke or magnetic frame A' which come opposite to said plates or the equivalents I rigidly secure temporarily the said plates or the equivalents, carrying the pole-pieces to the body of the motor, and then I bore pole-pieces, as usual, to suit the armature of the motor. It is desirable that the plates F' or the equivalents and the pole-pieces B' carried thereby should not be capable of motion at right angles to the armature spindle or shaft of the motor, and I make the hinges H', in which turn the levers I', in connection with the brake-operating arrangements, parallel with the said armature spindle or shaft. I also prefer that the hinges H' of the said levers I' shall be on opposite sides of the armature, as shown, as otherwise the magnetic lines of force in the armature of the motor may be distorted and undue strain be put on the motor-shaft. The connection between the plates F' or the equivalents and the brake-blocks and the springs for putting on the brakes may be arranged in any suitable way—such, for instance, as that illustrated in Fig. 3, wherein the levers I', pivoted at H' to the frame A', are connected by links $i'$ to the lever $m'$, fixed to the weight-bar $n^2$ at $n'$, the levers G', carrying the brake-blocks K', which bear on the periphery of the brake-wheel J' by links $p'$ of the bar $m'$, one above and the other below the point $n'$. The other ends of these levers G' may be made fast to the frame A', if desired; but it is preferred to connect them to the springs L' by means of the hooks $l'$ to more firmly hold the blocks on the wheel J' when the motor is not running. It will now be seen that when the motor is started the pole-pieces B' are attracted, which through the lever mechanism just described will move the upper part of the lever $m'$ to the left, as shown in this figure. This lever $m'$ through the links $b'$ and levers G' will withdraw the brake-blocks K' from the wheel J'. Likewise when the motor is stopped the pole-pieces B' are no longer attracted, and the weight-lever $n^2$, through the links $p'$ at one end and the spring L' at the other, tends to draw the levers G' together at both ends, thereby applying the brake-blocks K' to the wheel J'.

I claim as my invention—

1. In combination with a brake-operating means for electric motors, a motor comprising a magnetic frame having a yoke, and pole-pieces adapted to keep off the brake while the motor is running, said pole-pieces being magnetically spaced from the yoke, and a movable magnetic plate bridging the space and connected with the brake-operating means.

2. In combination with a brake-operating means for electric motors, a motor comprising a magnetic frame having a yoke, and pole-pieces adapted to keep off the brake while the motor is running, said yoke and pole-pieces being connected by non-magnetic material, and a movable magnetic plate bridging the said non-magnetic material and connected with the brake.

In testimony whereof I have signed my name to this specification in the presence of two subscribing witnesses.

WILLIAM HARDING SCOTT

Witnesses:
   GILBERT FLETCHER TYSON,
   WILLIAM GERALD REYNOLDS.